(12) United States Patent
Cho

(10) Patent No.: US 12,493,079 B2
(45) Date of Patent: Dec. 9, 2025

(54) ABNORMAL CELL DETECTION METHOD, ABNORMAL CELL DETECTION DEVICE, AND BATTERY PACK

(71) Applicant: SAMSUNG SDI CO., LTD., Yongin-si (KR)

(72) Inventor: Duckgu Cho, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 173 days.

(21) Appl. No.: 18/237,645

(22) Filed: Aug. 24, 2023

(65) Prior Publication Data

US 2024/0175936 A1 May 30, 2024

(30) Foreign Application Priority Data

Nov. 28, 2022 (KR) .......................... 10-2022-0161767

(51) Int. Cl.
*G01R 31/396* (2019.01)
*G01R 31/3835* (2019.01)
(Continued)

(52) U.S. Cl.
CPC ....... *G01R 31/396* (2019.01); *G01R 31/3835* (2019.01); *G01R 31/3842* (2019.01);
(Continued)

(58) Field of Classification Search
CPC .............. G01R 31/3835; G01R 31/392; G01R 31/3842; G01R 31/396; H02J 7/0014; H02J 7/0047; H02J 7/0029; H02J 7/005; H02J 7/0036; H02J 7/00302; H02J 7/00304; H02J 7/00306; H02J 7/0048; H02J 7/0068;
(Continued)

(56) References Cited

U.S. PATENT DOCUMENTS

2011/0181246 A1* 7/2011 Tae ........................ H02J 7/0014
320/118
2014/0117939 A1* 5/2014 Lim ..................... H01M 10/482
320/134
(Continued)

FOREIGN PATENT DOCUMENTS

EP 4024654 A1 7/2022
JP 2003-282156 A 10/2003
(Continued)

OTHER PUBLICATIONS

European Search Report dated Mar. 1, 2024.
Japanese Notice of Allowance dated Sep. 9, 2024.

*Primary Examiner* — Raul J Rios Russo
(74) *Attorney, Agent, or Firm* — Lee IP Law, P.C.

(57) ABSTRACT

An abnormal cell detection method of a battery pack including a plurality of cells, the method including obtaining a first plurality of discharge rates for each cell during a first rest period in a cell balancing state, prohibiting a cell balancing of the plurality of cells if a first cell having a first discharge rate greater than or equal to a first threshold value is detected, obtaining a second plurality of discharge rates during a second rest period for each of the plurality of cells in a cell balancing prohibition state, and detecting an abnormal cell having a second discharge rate greater than or equal to a second threshold value.

17 Claims, 2 Drawing Sheets

(51) Int. Cl.
  *G01R 31/3842*   (2019.01)
  *G01R 31/392*    (2019.01)
  *H01M 10/42*     (2006.01)
  *H01M 10/48*     (2006.01)
  *H02J 7/00*      (2006.01)

(52) U.S. Cl.
  CPC .......... *G01R 31/392* (2019.01); *H02J 7/0014* (2013.01); *H02J 7/0047* (2013.01); *H01M 10/42* (2013.01); *H01M 10/482* (2013.01); *H02J 7/0029* (2013.01)

(58) Field of Classification Search
  CPC ..... H02J 7/0031; H02J 7/00712; Y02E 60/10; H01M 10/482; H01M 2010/4271; H01M 10/42; H01M 10/441
  USPC ......................................................... 324/434
  See application file for complete search history.

(56) References Cited

U.S. PATENT DOCUMENTS

| | | | | |
|---|---|---|---|---|
| 2014/0330463 A1* | 11/2014 | Jeong | .................... | H02J 7/0014 |
| | | | | 320/134 |
| 2019/0052098 A1* | 2/2019 | Hong | .................... | H01M 10/48 |
| 2020/0079240 A1* | 3/2020 | Lee | ......................... | H02J 7/00 |
| 2022/0216705 A1 | 7/2022 | Fogelberg et al. | | |

FOREIGN PATENT DOCUMENTS

| | | | |
|---|---|---|---|
| JP | 2009-284717 A | 12/2009 |
| JP | 2017-221026 A | 12/2017 |
| JP | 2022-098758 A | 7/2022 |
| KR | 10-2021-0059566 A | 5/2021 |
| KR | 10-2021-0155980 A | 12/2021 |

\* cited by examiner

ABNORMAL CELL DETECTION METHOD, ABNORMAL CELL DETECTION DEVICE, AND BATTERY PACK

CROSS-REFERENCE TO RELATED APPLICATION

Korean Patent Application No. 10-2022-0161767, filed in the Korean Intellectual Property Office on Nov. 28, 2022, is incorporated herein by reference in its entirety.

BACKGROUND

1. Field

An abnormal cell detection method, abnormal cell detection device, and battery pack are disclosed.

2. Description of the Related Art

A secondary battery that may be repeatedly charged and discharged differs from a primary battery that provides only irreversible conversion of chemical energy to electrical energy.

SUMMARY

Embodiments are directed to an abnormal cell detection method of a battery pack including a plurality of cells, the method including obtaining a first plurality of discharge rates for each cell during a first rest period in a cell balancing state, prohibiting a cell balancing of the plurality of cells if a first cell having a first discharge rate greater than or equal to a first threshold value is detected, obtaining a second plurality of discharge rates during a second rest period for each of the plurality of cells in a cell balancing prohibition state, and detecting an abnormal cell having a second discharge rate greater than or equal to a second threshold value.

The abnormal cell detection method wherein the second threshold value is greater than the first threshold value.

The abnormal cell detection method wherein the obtaining of the second plurality of discharge rates includes obtaining the second discharge rate of only cells having discharge rates greater than or equal to the first threshold value among the plurality of cells.

The abnormal cell detection method further comprising blocking charging and discharging of the battery pack if the abnormal cell is detected.

The abnormal cell detection method further comprising transferring notification information indicating that the abnormal cell is detected along with information on the abnormal cell to a user.

The abnormal cell detection method wherein the obtaining of the first plurality of discharge rates includes continuously detecting a cell voltage of each of the plurality of cells during the first rest period and calculating a cell voltage change over time.

The abnormal cell detection method wherein the cell balancing prohibition state is entered even while a voltage difference or a state of charge difference between the plurality of cells exceeds an initiation criterion for entering the cell balancing state.

Embodiments are directed to an abnormal cell detection device, including a detection device configured to detect a voltage of each of a plurality of cells included in a battery module, and a battery management system configured to obtain a first plurality of discharge rates for each cell during a first rest period in a cell balancing state, prohibit a cell balancing of the plurality of cells if a first cell having a first discharge rate greater than or equal to a first threshold value is detected, obtain a second discharge rate during a second rest period for each cell of the plurality of cells in a cell balancing prohibition state, and detect an abnormal cell having a second discharge rate greater than or equal to a second threshold value.

The abnormal cell detection device wherein the second threshold value is greater than the first threshold value.

The abnormal cell detection device wherein the battery management system is further configured to obtain the second discharge rate of only cells having discharge rates greater than or equal to the first threshold value among the plurality of cells.

The abnormal cell detection device wherein the battery management system is further configured to block charging and discharging of the battery module if the abnormal cell is detected.

The abnormal cell detection device wherein the battery management system is further configured to transfer notification information indicating that the abnormal cell is detected along with information on the abnormal cell to a user.

The abnormal cell detection device wherein the battery management system obtaining the first plurality of discharge rates includes continuously detecting a cell voltage of each of the plurality of cells during the first rest period and calculating a cell voltage change over time.

The abnormal cell detection device wherein the battery management system is configured to enter the cell balancing prohibition state even while a voltage difference or a state of charge difference between the plurality of cells exceeds an initiation criterion for entering the cell balancing state.

Embodiments are directed to a battery pack including an abnormal cell detection device, the battery pack including a detection device configured to detect a voltage of each of a plurality of cells included in a battery module, and a battery management system configured to obtain a first plurality of discharge rates for each cell during a first rest period in a cell balancing state, prohibit a cell balancing of the plurality of cells if a first cell having a first discharge rate greater than or equal to a first threshold value is detected, obtain a second discharge rate during a second rest period for each cell of the plurality of cells in a cell balancing prohibition state, and detect an abnormal cell having a second discharge rate greater than or equal to a second threshold value.

The battery pack wherein the second threshold value is greater than the first threshold value.

The battery pack wherein the battery management system is further configured to obtain the second discharge rate of only cells having discharge rates greater than or equal to the first threshold value among the plurality of cells.

The battery pack wherein the battery management system is further configured to block charging and discharging of the battery module if the abnormal cell is detected, and transfer notification information indicating that the abnormal cell is detected along with information on the abnormal cell to a user.

The battery pack wherein the battery management system obtaining the first plurality of discharge rates includes continuously detecting a cell voltage of each of the plurality of cells during the first rest period and calculating a cell voltage change over time.

The battery pack wherein the battery management system is configured to enter the cell balancing prohibition state even while a voltage difference or a state of charge difference between the plurality of cells exceeds an initiation criterion for entering the cell balancing state.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey exemplary implementations to those skilled in the art.

Electrically connecting two constituent elements includes directly connecting two constituent elements and connecting the same with another constituent element therebetween. The other constituent element may include a switch, a resistor, or a capacitor. If the embodiments are described, an expression of connection signifies electrical connection if an expression of direct connection is not provided. As used herein, the term "or" is not an exclusive term, e.g., "A or B" would include A, B, or A and B.

Hereinafter, a method for detecting an abnormal cell and a device for detecting the abnormal cell and a battery pack that perform the method according to embodiments will be described in detail with reference to necessary drawings.

Figure 1:
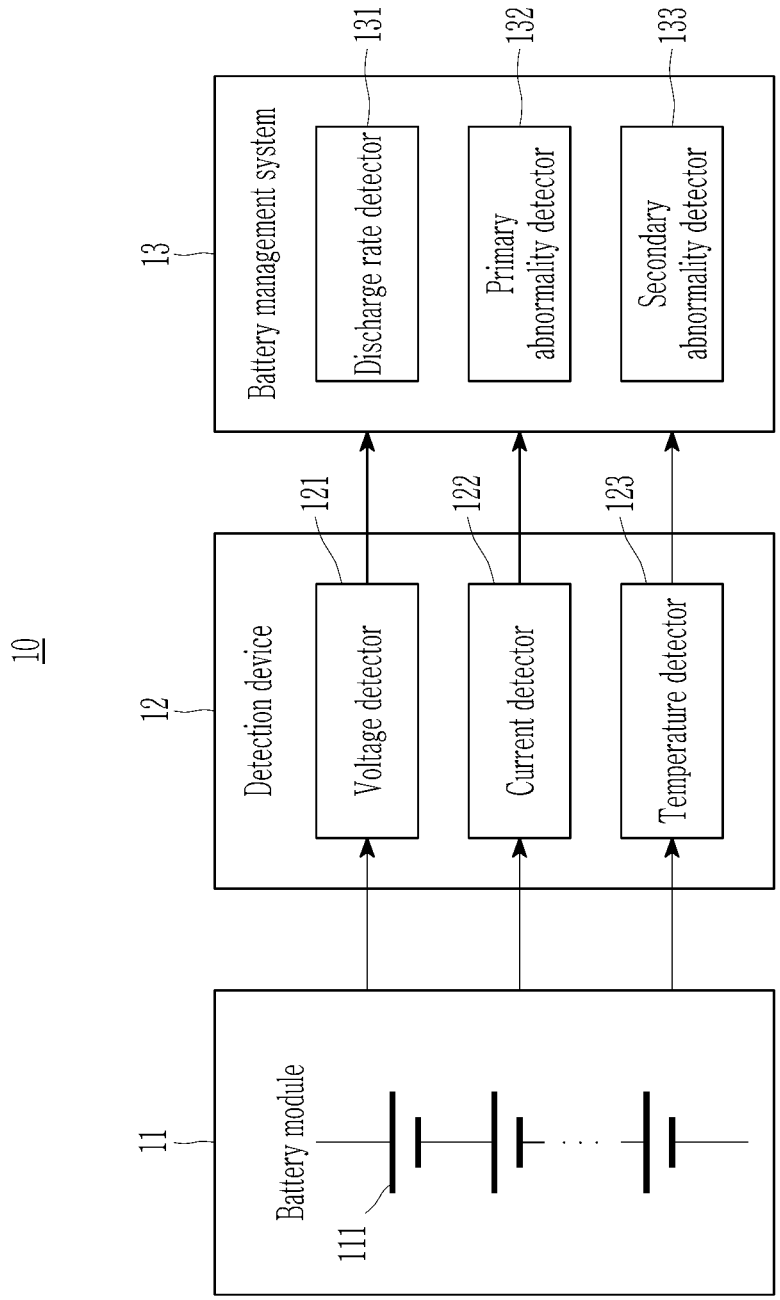
FIG. 1 shows an example embodiment of a battery pack.

FIG. 1 shows an example embodiment of a battery pack. Referring to FIG. 1, a battery pack 10 according to the embodiment may include a battery module 11, a detection device 12, and a battery management system (BMS) 13. The battery module 11 may include a plurality of cells 111 connected in series or parallel to each other.

The detection device 12 may detect states of the cells 111 constituting the battery module 11. The detection device 12 may include a voltage detector 121 that may detect a cell voltage of each cell, or a module voltage of the battery module 11. The detection device 12 may further include a current detector 122 that may detect an electric current flowing through the battery module 11. The detection device 12 may further include a temperature detector 123 that may detect a temperature of at least one point of the battery module 11.

The battery management system 13 may receive state information (e.g., voltage, current, and temperature) of the battery module 11 from the detection device 12. The battery management system 13 may monitor a state (e.g., voltage, current, temperature, state of charge (SOC), or life span (state of health (SOH))) of the battery module 11 based on the state information received from the detection device 12. In addition, the battery management system 13 may perform a control function (e.g., temperature control, cell balancing control, or charge/discharge control), or a protection function (e.g., abnormal cell detection, overdischarge prevention, overcharge prevention, or overcurrent prevention) based on the state monitoring result.

According to the present embodiment, the battery management system 13 may operate as an abnormal cell detection device of the battery module 11 together with the detection device 12. The battery management system 13 may detect a cell in which an abnormality occurs due to an internal foreign material or an internal short circuit and may be included in the cells 111 constituting the battery module 11 based on the state information received from the detection device 12. To this end, the battery management system 13 may include a discharge rate detector 131, a primary abnormality detector 132, and a secondary abnormality detector 133.

The discharge rate detector 131 may detect a discharge rate of each cell 111 within a rest period of the battery pack 10. The discharge rate detector 131 may continuously obtain a cell voltage of each cell 111 during the rest period through the voltage detector 121, and may calculate a change of the cell voltage over time to calculate the discharge rate of each cell 111. Here, the rest period may mean a state in which charging and discharging of the battery pack 10 is stopped.

If the discharge rate during the rest period of each cell 111 is calculated, the primary abnormality detector 132 may compare the calculated discharge rate with a first threshold value. If a cell 111 has a discharge rate in the rest period that is greater than or equal to the first threshold value, the primary abnormality detector 132 may determine that there is a possibility that an abnormal cell exists in the battery module 11.

If it is determined by the primary abnormality detector 132 that there is a possibility that the abnormal cell exists in the battery module 11, the battery management system 13 may enter a warning step to limit cell balancing of the battery module 11. In an implementation, if the battery management system 13 enters the warning step, the cell balancing may not be performed even if a voltage difference or an SOC difference between the cells 111 constituting the battery module 11 exceeds an initiation criterion of the cell balancing.

Typically, the cell balancing may be performed to equalize states of the cells constituting the battery module 11, and whether the cell balancing is started may be determined according to a voltage or an SOC of each cell. On the other hand, if the cell balancing is performed in a state in which the battery module 11 includes the abnormal cell, state imbalance of the abnormal cell may be alleviated due to the cell balancing so that the abnormal cell may not be detected early and a situation that leads to ignition may occur.

Therefore, if it is determined by the primary abnormality detector 132 that there is a possibility that the abnormal cell exists in the battery module 11 in a state in which the cell balancing is allowed, the battery management system 13 may stop the cell balancing to prevent a state abnormality of the abnormal cell from being covered due to the cell balancing. Then, the battery management system 13 may execute the secondary abnormality detector 133 to finally detect the abnormal cell in a state in which the cell balancing is stopped due to the determination by the primary abnormality detector 132 that there is a possibility that the abnormal cell exists in the battery module 11.

If the battery management system 13 enters the warning step so that the cell balancing is stopped, the secondary abnormality detector 133 may compare the discharge rate of each cell 111 during the rest period with a second threshold value in a state in which the cell balancing is stopped. In addition, if a cell having a discharge rate equal to or higher than the second threshold value is detected in the rest period, the secondary abnormality detector 133 may finally determine the cell as the abnormal cell. In order to increase detection accuracy of the abnormal cell, the second threshold value may be greater than the first threshold value. In order to reduce an amount of calculation, the secondary abnormality detector 133 may compare a discharge rate of only a cell determined by the primary abnormality detector 132 to have the discharge rate in the rest period greater than or equal to the first threshold value with the second threshold value. The secondary abnormality detector 133 may compare the discharge rate in the rest period of all cells 111 constituting the battery module 11 with the second threshold value.

If the abnormal cell is finally detected, the secondary abnormality detector 133 may block charging and discharging of the battery module 11 to protect the battery module 11 from risk of ignition. In addition, if the abnormal cell is detected, the secondary abnormality detector 133 may transfer notification information indicating that the abnormal cell is detected together with information on the abnormal cell to a user.

Figure 2:
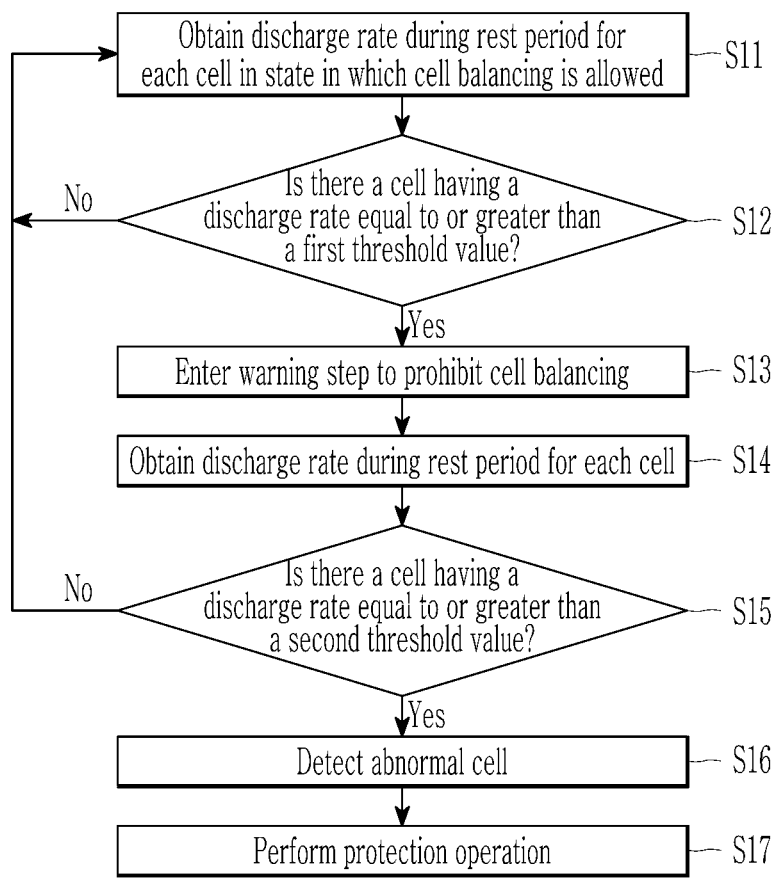
FIG. 2 shows steps in an abnormal cell detection method according to an example embodiment.

FIG. 2 shows steps in an abnormal cell detection method according to an example embodiment. The method of FIG. 2 may be performed by the battery management system described above with reference to FIG. 1.

Referring to FIG. 2, the battery management system 13 according to an embodiment may obtain the discharge rate during the rest period of each cell 111 constituting the battery module 11 in a state in which the cell balancing is allowed (S11). The battery management system 13 may continuously detect the cell voltage of each cell 111 through the detection device 12 during the rest period, and may calculate a change in the detected cell voltage over time to obtain the discharge rate of each cell 111.

If the discharge rate of each cell 111 in the rest period is obtained, the battery management system 13 may check whether a cell having a discharge rate greater than or equal to the first threshold value exists among the cells 111 (S12).

If there is a cell having a discharge rate greater than or equal to the first threshold value (S12), the battery management system 13 may enter a warning step to prohibit the cell balancing (S13). In an implementation, if the battery management system 13 enters the warning step, the battery management system 13 may deactivate a cell balancing function so that the cell balancing is not performed even if the voltage difference or the SOC difference between the cells 111 constituting the battery module 11 exceeds the initiation criterion of the cell balancing.

Thereafter, if the battery pack 10 enters the rest period, the battery management system 13 may obtain the discharge rate of each cell 111 during the rest period (S14). If the discharge rate of each cell 111 in the rest period is obtained, the battery management system 13 may check whether a cell having a discharge rate equal to or higher than the second threshold value exists among the cells 111 (S15).

If the cell having the discharge rate equal to or higher than the second threshold value is checked (S15), the battery management system 13 may detect the cell as the abnormal cell (S16), and may perform a protection operation (S17). In an implementation, the battery management system 13 may block charging and discharging of the battery module 11, and may notify the user that the abnormal cell is detected.

According to the above-described embodiment, the abnormal cell detection device may compare the discharge rate of each cell 111 in the rest period with the first threshold value in a state in which the cell balancing is allowed to determine a possibility of existence of the abnormal cell. If it is determined that there is a possibility that an abnormal cell exists, the abnormal cell detection device may finally detect the abnormal cell by comparing the discharge rate of each cell 111 during the rest period with the second threshold value in a state in which the cell balancing is stopped. This method has an effect of enabling early detection of the abnormal cell and improving detection accuracy.

Electronic or electrical devices according to embodiments of the present disclosure or other related devices or constituent elements may be realized by using appropriate hardware, firmware (e.g., an application-specific integrated circuit), software, or combinations of software, firmware, and hardware. In an implementation, various configurations of the above-noted devices may be positioned on one integrated circuit (IC) chip or an individual IC chip. In addition, various configurations of the above-noted devices may be realized on a flexible printed circuit film, a tape carrier package (TCP), a printed circuit board (PCB), or one substrate. The electrical or mutual connections described in the present specification may, e.g., be realized by the PCB, wires on different types of circuit carriers, or conductive elements. The conductive elements may, e.g., include metallization such as surface metallizations or pins, and may include conductive polymers or ceramics.

In addition, the various configurations of the devices may be performed by at least one processor to perform the above-described various functions, they may be performed in at least one computing device, and they may be processes or threads for performing computer program instructions and interacting with other system constituent elements. The computer program instruction may be stored in a memory realizable in a computing device using a standard memory device such as a random-access memory (RAM). The computer program instruction may also be stored in a non-transitory computer readable medium such as a CD-ROM or a flash drive.

Further, a person of ordinary skill in the art must understand that various functions of the computing device may be combined or united to a single computing device, or functions of a specific computing device may be dispersed to at least another computing device while not digressing from the range of the embodiments of the present disclosure.

By way of summation and review, a low-capacity secondary battery may be used as a power supply for a small electronic device such as a mobile phone, a laptop computer, or a camcorder, and a high-capacity secondary battery may be used as a power supply for a hybrid vehicle.

In general, a secondary battery cell may include an electrode assembly including a positive electrode, a negative electrode, and a separator between the positive electrode and the negative electrode, a case accommodating the electrode assembly, and an electrode terminal electrically connected to the electrode assembly. An electrolyte solution may be injected into the case to enable charging and discharging of the battery cell through an electrochemical reaction between the positive electrode, the negative electrode, and the electrolyte solution. The shape of the case such as a cylindrical or rectangular shape may vary depending on use of the battery cell.

An internal foreign material or an internal short circuit of the battery cell could overheat the battery cell to cause a safety problem of a battery pack such as thermal runaway or ignition. Therefore, to secure safety of the battery pack, an abnormal cell may be detected early to take measures against the abnormal cell. According to the present disclosure, safety of a battery pack may be improved by detecting the abnormal cell early.

One or more embodiments may provide an abnormal cell detection method, an abnormal cell detection device, and a battery pack capable of detecting an abnormal cell at an early stage.

In the drawing figures, the dimensions of layers and regions may be exaggerated for clarity of illustration. It will also be understood that if a layer or element is referred to as being "on" another layer or substrate, it can be directly on the other layer or substrate, or intervening layers may also be present. Further, it will be understood that if a layer is referred to as being "under" another layer, it can be directly under, and one or more intervening layers may also be present. In addition, it will also be understood that if a layer is referred to as being "between" two layers, it can be the only layer between the two layers, or one or more intervening layers may also be present. Like reference numerals refer to like elements throughout.

Hence, for the purpose of complete understanding on the aspects and the characteristics of the present disclosure, processes, factors, and skills that may not be needed by a person of ordinary skill in the art may not be described. In the drawings, relative sizes of elements, layers, and regions may be exaggerated for clarity.

In the present specification, the term "and/or" includes all or random combinations of a plurality of items that are related and arranged. If the embodiments of the present disclosure are described, the use of "can" or "may" signifies at least one embodiment of the present disclosure. Regarding the description on an embodiment of the present disclosure, a singular term may include a plural form unless stated in another way.

In the present specification, terms including ordinal numbers such as first and second will be used only to describe various components, and are not to be interpreted as limiting these components. The terms are only used to differentiate one component from other components. In an implementation, a first constituent element could be termed a second constituent element, and similarly, a second constituent element could be termed a first constituent element, without departing from the scope of the present disclosure.

It will be understood that if a constituent element or layer is referred to as being "on," "connected to," or "coupled to" another constituent element or layer, it can be directly on, connected to, or coupled to the other constituent element or layer, or one or more intervening constituent elements or layers may be present. In addition, it will also be understood that if a constituent element or layer is referred to as being "between" two constituent elements or layers, it can be the only constituent element or layer between the two constituent elements or layers, or one or more intervening constituent elements or layers may also be present.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made.

What is claimed is:

1. An abnormal cell detection method of a battery pack including a plurality of cells, the method comprising:

continuously receiving, during a first rest period, by a battery management system controlling the battery pack, from at least one state detection device, one or more signals indicative of one or more states of each cell of the plurality of cells;

obtaining, by the battery management system, a first plurality of discharge rates for each cell based on cell voltage over time, during the first rest period in a cell balancing state, wherein during the first rest period, charging and discharging are stopped;

prohibiting, by the battery management system, a cell balancing of the plurality of cells if a first cell having a first discharge rate greater than or equal to a first threshold value is detected by a primary abnormality detector;

obtaining, by the battery management system, a second plurality of discharge rates based on cell voltage over time, during a second rest period for each of the plurality of cells in a cell balancing prohibition state;

detecting an abnormal cell having a second discharge rate greater than or equal to a second threshold value, wherein the second discharge rate is greater than the first discharge rate; and based on the battery management system receiving a signal indicating that an abnormal cell has been detected, blocking, by the battery management system, charging and discharging of the battery pack.

2. The abnormal cell detection method as claimed in claim 1, wherein the obtaining of the second plurality of discharge rates includes obtaining the second discharge rate of only cells having discharge rates greater than or equal to the first threshold value among the plurality of cells.

3. The abnormal cell detection method as claimed in claim 1, further comprising blocking charging and discharging of the battery pack if the abnormal cell is detected.

4. The abnormal cell detection method as claimed in claim 3, further comprising transferring notification information indicating that the abnormal cell is detected along with information on the abnormal cell to a user.

5. The abnormal cell detection method as claimed in claim 1, wherein the obtaining of the first plurality of discharge rates includes continuously detecting a cell voltage of each of the plurality of cells during the first rest period and calculating a cell voltage change over time.

6. The abnormal cell detection method as claimed in claim 1, wherein the cell balancing prohibition state is entered even while a voltage difference or a state of charge difference between the plurality of cells exceeds an initiation criterion for entering the cell balancing state.

7. An abnormal cell detection device, comprising:

a voltage detector to continuously detect a voltage of each of a plurality of cells included in a battery module; and a battery management system including a processor configured to:

continuously receive, during a first rest period, by a battery management system controlling the battery pack, from at least one state detection device, one or more signals indicative of one or more states of each cell of the plurality of cells;

obtain, by the battery management system, a first plurality of discharge rates for each cell based on cell voltage over time, during the first rest period in a cell balancing state, wherein during the first rest period, charging and discharging are stopped;

prohibit, by the battery management system, a cell balancing of the plurality of cells if a first cell having a first discharge rate greater than or equal to a first threshold value is detected by a primary abnormality detector;

obtain, by the battery management system, a second plurality of discharge rates based on cell voltage over time, during a second rest period for each of the plurality of cells in a cell balancing prohibition state;

detect an abnormal cell having a second discharge rate greater than or equal to a second threshold value, wherein the second discharge rate is greater than the first discharge rate; and based on the battery management system receiving a signal indicating that an abnormal cell has been detected, blocking, by the battery management system, charging and discharging of the battery pack.

8. The abnormal cell detection device as claimed in claim 7, wherein the battery management system is further configured to obtain the second discharge rate of only cells having discharge rates greater than or equal to the first threshold value among the plurality of cells.

9. The abnormal cell detection device as claimed in claim 7, wherein the battery management system is further configured to block charging and discharging of the battery module if the abnormal cell is detected.

10. The abnormal cell detection device as claimed in claim 9, wherein the battery management system is further configured to transfer notification information indicating that the abnormal cell is detected along with information on the abnormal cell to a user.

11. The abnormal cell detection device as claimed in claim 7, wherein the battery management system obtaining the first plurality of discharge rates includes continuously detecting a cell voltage of each of the plurality of cells during the first rest period and calculating a cell voltage change over time.

12. The abnormal cell detection device as claimed in claim 7, wherein the battery management system is configured to enter the cell balancing prohibition state even while a voltage difference or a state of charge difference between the plurality of cells exceeds an initiation criterion for entering the cell balancing state.

13. A battery pack including an abnormal cell detection device, the battery pack comprising:

a voltage detector to continuously detect a voltage of each of a plurality of cells included in a battery module; and a battery management system including a processor configured to:

continuously receive, during a first rest period, by a battery management system controlling the battery pack, from at least one state detection device, one or more signals indicative of one or more states of each cell of the plurality of cells;

obtain, by the battery management system, a first plurality of discharge rates for each cell based on cell voltage over time, during the first rest period in a cell balancing state, wherein during the first rest period, charging and discharging are stopped;

prohibit, by the battery management system, a cell balancing of the plurality of cells if a first cell having a first discharge rate greater than or equal to a first threshold value is detected by a primary abnormality detector;

obtain, by the battery management system, a second plurality of discharge rates based on cell voltage over time, during a second rest period for each of the plurality of cells in a cell balancing prohibition state;

detect an abnormal cell having a second discharge rate greater than or equal to a second threshold value, wherein the second discharge rate is greater than the first discharge rate; and based on the battery management system receiving a signal indicating that an abnormal cell has been detected, blocking, by the battery management system, charging and discharging of the battery pack.

14. The battery pack as claimed in claim 13, wherein the battery management system is further configured to obtain the second discharge rate of only cells having discharge rates greater than or equal to the first threshold value among the plurality of cells.

15. The battery pack as claimed in claim 13, wherein the battery management system is further configured to:

block charging and discharging of the battery module if the abnormal cell is detected, and transfer notification information indicating that the abnormal cell is detected along with information on the abnormal cell to a user.

16. The battery pack as claimed in claim 13, wherein the battery management system obtaining the first plurality of discharge rates includes continuously detecting a cell voltage of each of the plurality of cells during the first rest period and calculating a cell voltage change over time.

17. The battery pack as claimed in claim 13, wherein the battery management system is configured to enter the cell balancing prohibition state even while a voltage difference or a state of charge difference between the plurality of cells exceeds an initiation criterion for entering the cell balancing state.

* * * * *